US011471970B2

(12) United States Patent
Preundler et al.

(10) Patent No.: US 11,471,970 B2
(45) Date of Patent: Oct. 18, 2022

(54) MIG/MAG WELDING TORCH BODY, TIG WELDING TORCH BODY, MIG/MAG WELDING TORCH HANDLE, AND MIG/MAG WELDING TORCH COMPRISING SUCH A MIG/MAG WELDING TORCH BODY AND MIG/MAG WELDING TORCH HANDLE

(71) Applicant: Fronius International GmbH, Pettenbach (AT)

(72) Inventors: David Preundler, Pettenbach (AT); Klaus Oberndorfer, Pettenbach (AT); Anton Preundler, Pettenbach (AT)

(73) Assignee: Fronius International GmbH, Pettenbach (AT)

( * ) Notice: Subject to any disclaimer, the term of this patent is extended or adjusted under 35 U.S.C. 154(b) by 0 days.

(21) Appl. No.: 17/273,815

(22) PCT Filed: Sep. 5, 2019

(86) PCT No.: PCT/EP2019/073642
§ 371 (c)(1),
(2) Date: Mar. 5, 2021

(87) PCT Pub. No.: WO2020/049076
PCT Pub. Date: Mar. 12, 2020

(65) Prior Publication Data
US 2021/0339331 A1    Nov. 4, 2021

(30) Foreign Application Priority Data

Sep. 6, 2018  (EP) ..................................... 18192965

(51) Int. Cl.
*B23K 9/29*    (2006.01)
*B23K 9/12*    (2006.01)
(Continued)

(52) U.S. Cl.
CPC .............. *B23K 9/291* (2013.01); *B23K 9/123* (2013.01); *B23K 9/285* (2013.01); *B23K 9/323* (2013.01)

(58) Field of Classification Search
CPC ........ B23K 9/291; B23K 9/123; B23K 9/285; B23K 9/323
See application file for complete search history.

(56) References Cited

U.S. PATENT DOCUMENTS 4,864,099 A * 9/1989 Cusick, III ............. B23K 9/285
219/137.62
5,866,874 A * 2/1999 Haczynski ............. B23K 9/296
219/137.31
(Continued)

FOREIGN PATENT DOCUMENTS

WO    2004/026518 A2    4/2004
WO    2010/135752 A2    12/2010
(Continued)

OTHER PUBLICATIONS

International Search Report in PCT/EP2019/073642, dated Nov. 18, 2019.
(Continued)

*Primary Examiner* — Brian W Jennison
(74) *Attorney, Agent, or Firm* — Collard & Roe, P.C.

(57) ABSTRACT

A MIG/MAG welding torch body includes a second channel, which is arranged coaxially to the central channel, and a further third channel, which is arranged coaxially to the second channel, wherein a connection is provided between the second channel and the third channel. The first channel has an orifice in the center of the receiving part, the second channel has an orifice on the lateral side of the receiving part, and the third channel has an orifice on the lateral side of the receiving part.

14 Claims, 5 Drawing Sheets

(51) Int. Cl.
*B23K 9/28* (2006.01)
*B23K 9/32* (2006.01)

(56) References Cited

U.S. PATENT DOCUMENTS

| | | | |
|---|---|---|---|
| 6,025,574 A * | 2/2000 | Colangelo, Jr. ........ | B23K 9/295 200/43.17 |
| 6,720,528 B1 * | 4/2004 | Matiash ................. | B23K 9/323 219/137.31 |
| 8,507,823 B2 | 8/2013 | Leeb et al. | |
| 9,533,369 B2 * | 1/2017 | Oberndorfer .......... | B23K 9/323 |
| 9,636,767 B2 | 5/2017 | Oberndorfer et al. | |
| 9,669,487 B2 * | 6/2017 | Basit ....................... | B23K 9/10 |
| 10,328,515 B2 * | 6/2019 | Jansma ................... | B23K 9/295 |
| 2015/0114943 A1 * | 4/2015 | Oberndorfer .......... | B23K 9/323 219/137.63 |
| 2016/0074973 A1 | 3/2016 | Kachline et al. | |

FOREIGN PATENT DOCUMENTS

| | | |
|---|---|---|
| WO | 2012/019208 A1 | 2/2012 |
| WO | 2013/142887 A2 | 10/2013 |
| WO | 2013/142888 A1 | 10/2013 |

OTHER PUBLICATIONS

European Search Report in EP 18192965.4-1016, dated Mar. 20, 2019, with English translation of relevant parts.

* cited by examiner

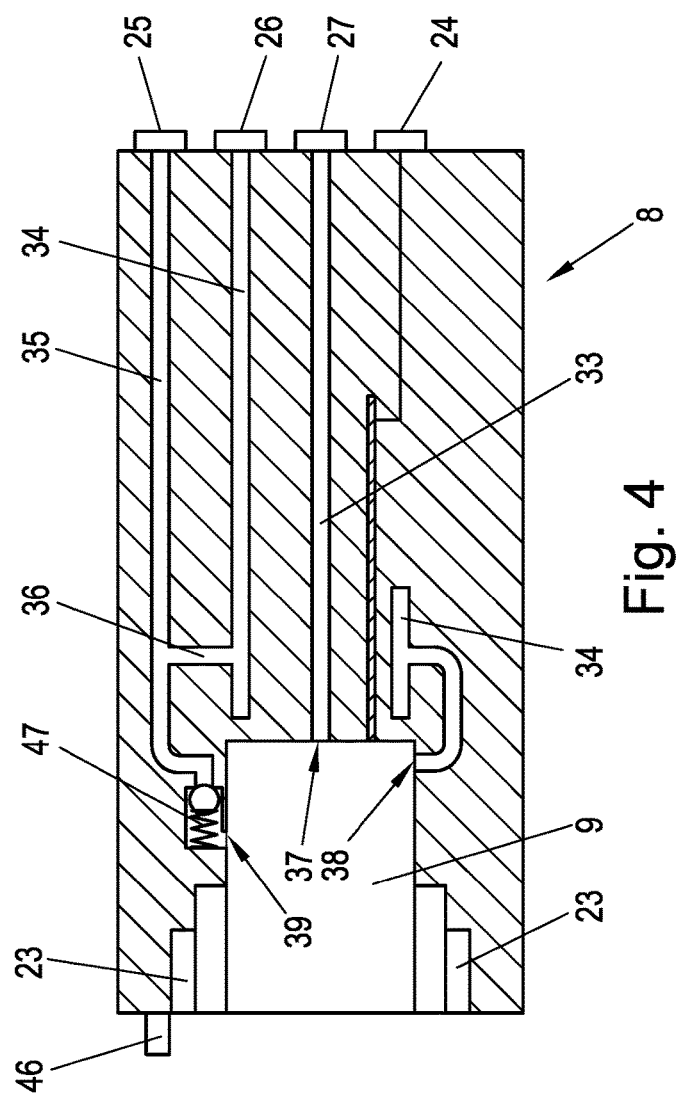
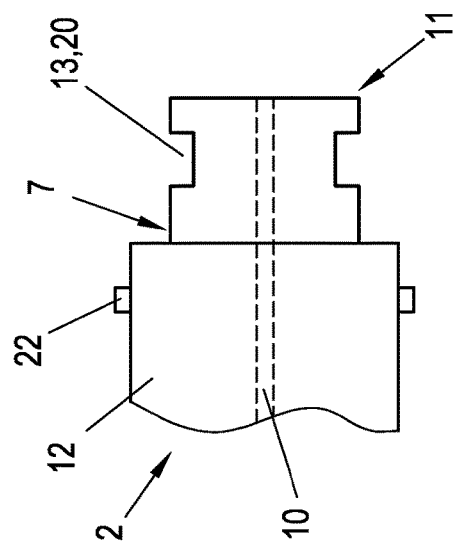
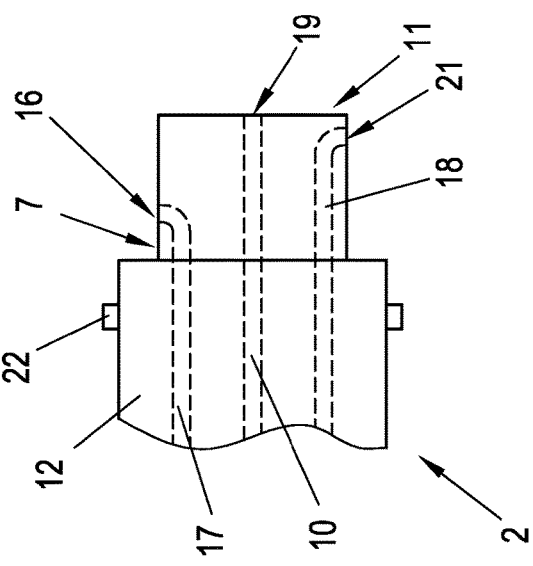

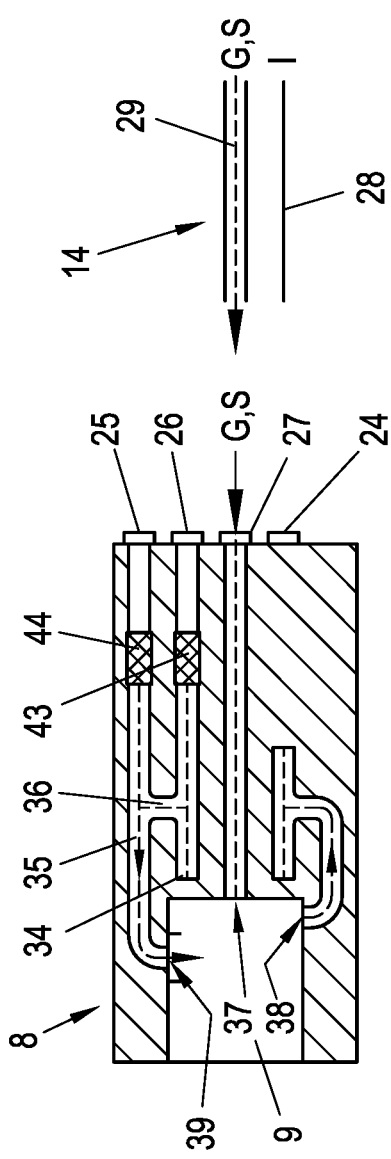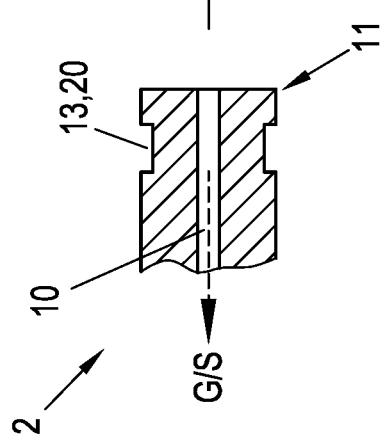
Fig. 5
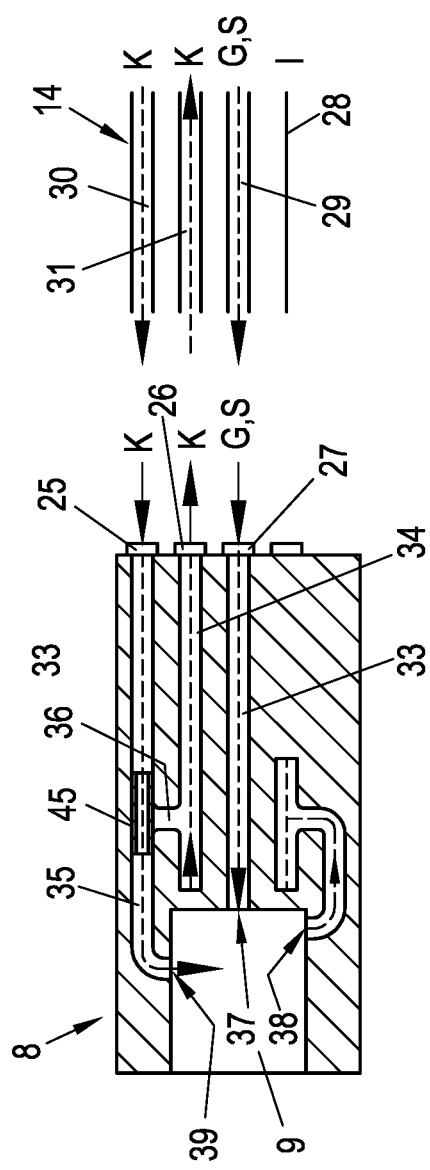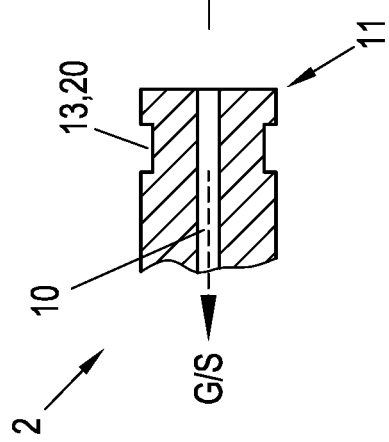
Fig. 6

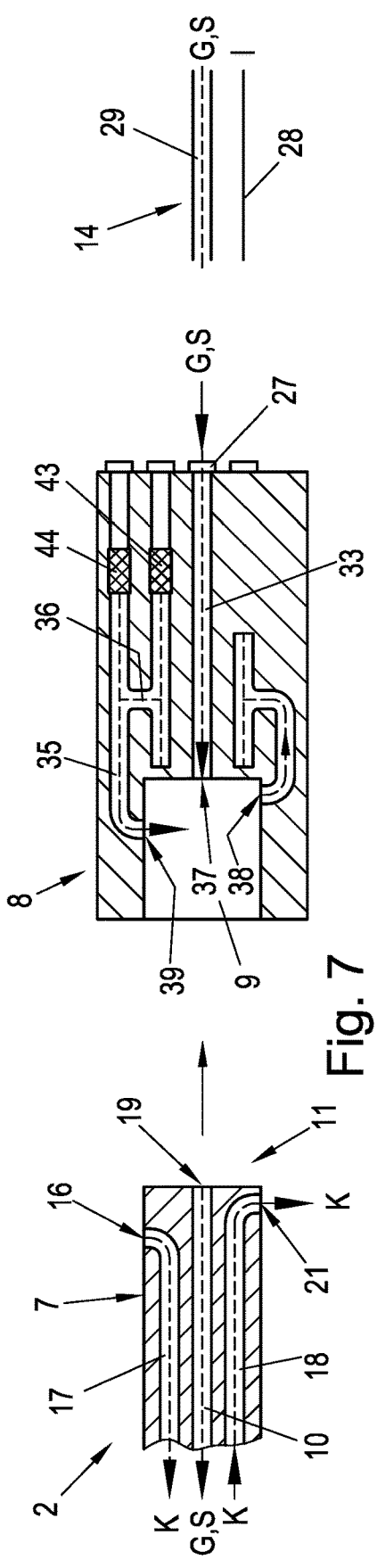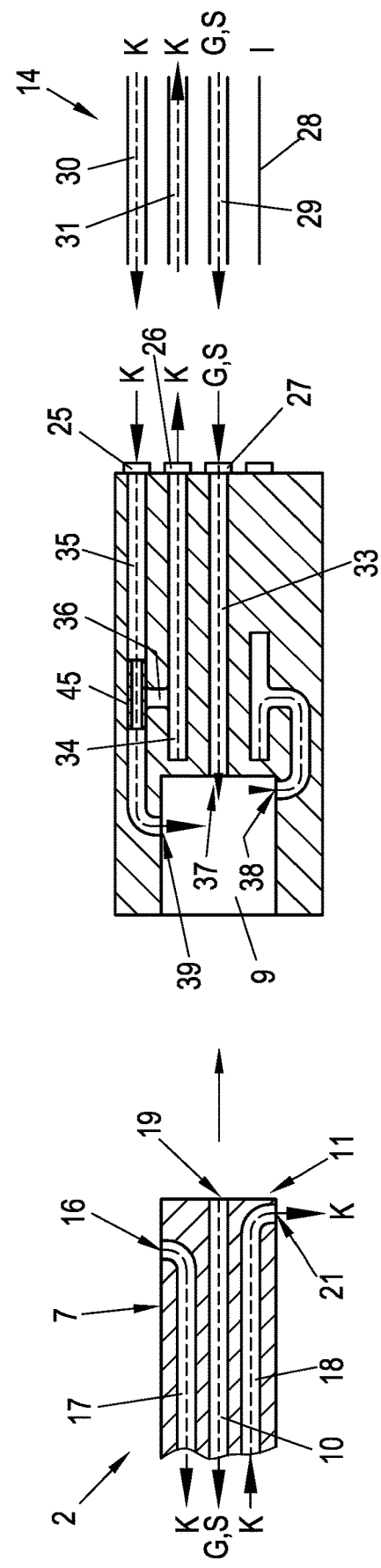

MIG/MAG WELDING TORCH BODY, TIG WELDING TORCH BODY, MIG/MAG WELDING TORCH HANDLE, AND MIG/MAG WELDING TORCH COMPRISING SUCH A MIG/MAG WELDING TORCH BODY AND MIG/MAG WELDING TORCH HANDLE

CROSS REFERENCE TO RELATED APPLICATIONS

This application is the National Stage of PCT/EP2019/073642 filed on Sep. 5, 2019, which claims priority under 35 U.S.C. § 119 of European Application No. 18192965.4 filed on Sep. 6, 2018, the disclosure of which is incorporated by reference. The international application under PCT article 21(2) was not published in English.

The invention relates to a MIG/MAG welding torch body, comprising a pipe bend, a contact nozzle for contacting and guiding a consumable welding wire, a gas nozzle, and an essentially cylindrical plug element, which is arranged at the pipe bend, for the detachable connection to a corresponding receiving part of a MIG/MAG welding torch handle, said plug element having an inlet opening for the protective gas, and a gas channel, which is connected to the inlet opening, for guiding the protective gas to the gas nozzle and simultaneously for guiding the welding wire, and which is formed for transferring a welding current to the contact nozzle, wherein the inlet opening is arranged essentially centrally at the distal end of the plug element.

The invention further relates to a MIG/MAG welding torch handle comprising a current transmission element, a central channel, and a receiving part for the detachable connection to a plug element of a MIG/MAG welding torch body.

Lastly, the invention is directed to a MIG/MAG welding torch comprising an above-mentioned MIG/MAG welding torch body and an above-mentioned MIG/MAG welding torch handle.

The invention is also applicable to a TIG (tungsten inert gas) welding torch body, comprising a torch neck, an electrode holder for receiving a non-consumable welding electrode, a gas nozzle, and an essentially cylindrical plug element, which is arranged in the torch neck, for the detachable connection to a corresponding receiving part of a TIG welding torch handle, and comprising a means for feeding a consumable welding wire, said plug element having an inlet opening for the protective gas, and a gas channel, which is connected to the inlet opening, for guiding the protective gas to the gas nozzle and simultaneously for guiding the welding wire, and which is formed for transferring a welding current to the electrode holder, wherein the inlet opening is arranged essentially centrally at the distal end of the plug element.

MIG (metal inert gas)/MAG (metal active gas) welding torches comprising a consumable welding wire consist of a welding torch body and of a welding torch handle, which is connected to a hose package, which includes the individual conduits for the welding current, the protective gas, the welding wire, and the possible cooling medium. To be able to replace wear parts of the welding torch, but to also be able to use different types of welding torches, the welding torch body is often detachably connected to the welding torch handle, and the hose package is connected to the welding torch handle with the corresponding connectors. In the case of the connection between welding torch body and welding torch handle, screw connections with the help of a union nut as well as plug connections are common.

For example, US 2016/0074973 A1 describes a welding torch, in the case of which the torch body can be assembled with the pipe bend via a plug connection to the torch handle, which, in turn, can be connected to the hose package.

WO 2010/135752 A2 also describes a MIG/MAG welding torch comprising components, which are of modular construction.

WO 2013/142887 A2 describes a gas-cooled MIG/MAG welding torch, and WO 2013/142888 A1 describes a water-cooled MIG/MAG welding torch, which are equipped for detachably connecting the pipe bend to the torch handle or the hose package by means of correspondingly designed plug and socket parts. The connecting means does not provide for a connection of a gas-cooled pipe bend to a water-cooled hose package or of a water-cooled pipe bend to a gas-cooled hose package.

A wide variety of types, in particular those comprising exclusively one protective gas conduit but also those comprising additional cooling medium conduits and likewise different hose packages with or without cooling medium conduits are distinguished in the case of welding torches. Depending on the use of a gas-cooled or water-cooled welding torch and the presence of a hose package with or without cooling medium conduits, various types of welding torch bodies and welding torch handles are necessary, which have to be produced by the welding component manufacturer and which have to be acquired and stored by the user. This increases the production effort and thus also the production and acquisition costs.

The object of the present invention thus consists in the creation of an above-mentioned MIG/MAG welding torch body, MIG/MAG welding torch handle, and MIG/MAG welding torch, which are to be constructed identically, if possible, for all versions, in particular gas-cooled version, and water-cooled (or cooling medium-cooled, respectively) version, so that the welding component manufacturer does not have to produce separate components for each version, and the welder does not have to acquire and store a corresponding number of components for each version of welding torches. The present invention is to in particular allow a connection of a gas- or water-cooled welding torch body, respectively, to essentially the same welding torch handle, and the connection of this welding torch handle to different hose packages (with and without cooling medium conduits). Disadvantages of known constructions are to be avoided or at least reduced.

The object of the invention is solved by means of an above-mentioned MIG/MAG welding torch body, in the case of which a connection channel, which is formed for connecting two orifices of channels for guiding a cooling medium arranged on the lateral side in the receiving part of the MIG/MAG welding torch handle, is arranged at the plug element on the lateral side. Due to the fact that the plug element of the welding torch body, which is formed for the connection to a correspondingly designed receiving part at the welding torch handle, has a connection channel for connecting the orifices of channels to the welding torch handle, more options can be created when connecting the welding torch body to the welding torch handle, depending on whether the welding torch body is embodied to be gas-cooled and water-cooled. Depending on the embodiment version of the welding torch body, other channels or the like can also be provided in the plug element, which cooperate with corresponding channels in the welding torch handle, in order to be able to attain a desired course of the protective gas and of possible cooling mediums, and the conveying of the welding wire through the channels. The welding torch body of the discussed type can be produced relatively simply and cost-efficiently.

The plug element is advantageously formed for the plug connection to the receiving part of the MIG/MAG welding torch handle, and has a so-called torch closure, which is formed for the fixation to the receiving part of the MIG/MAG welding torch handle, so as to be rotatable preferably by 180°. A quick, simple, and in particular tool-free fastening and detaching of the welding torch body to or from the welding torch handle, respectively, is thus made possible. The torch closure can be constructed in a variety of ways, in order to provide for the fixation by means of an axial movement and a rotation. For example, bayonet-like closures are conceivable.

In the case of a gas-cooled MIG/MAG welding torch body, the connection channel at the plug element is preferably formed by means of a circumferential channel, which is spaced apart from the distal end of the plug element.

In the case of a water-cooled or cooling medium-cooled MIG/MAG welding torch body, respectively, the connection channel in the plug element is formed by means of a channel for feeding the cooling medium, and a channel for returning the cooling medium, wherein the channel for feeding the cooling medium opens out in an inlet opening, which is arranged at the plug element on the lateral side, and the channel for returning the cooling medium opens out in a return opening, which is arranged at the plug element on the lateral side. A water-cooled MIG/MAG welding torch body is thus created, which can be connected easily and quickly to a corresponding MIG/MAG welding torch handle, and the channels of which can be connected accordingly to guide the protective gas, the welding wire, and cooling medium, depending on the used hose package (with or without cooling medium conduits). Even though water is mostly used as cooling medium, other cooling fluids or cooling gases are also conceivable.

According to a further feature of the invention, the torch closure is formed in an essentially tubular design and has fixing elements on the outer side, which cooperate with fixing elements of a complementary design at the receiving part of the MIG/MAG welding torch handle. This represents a simple realization option for the connection of the MIG/MAG welding torch body to the MIG/MAG welding torch handle by means of a combined axial and rotational movement, preferably by 180 degrees. The fixing elements can be formed by corresponding locking noses and guide grooves or the like.

The plug element, here at least the current-carrying part, is preferably made of metal, in particular brass, and the torch closure is made of plastic. Such materials have turned out to be particularly suitable because they can be machined correspondingly easily, and withstand the temperatures occurring during welding. In addition, safety-relevant functions, such as, e.g., the compliance with creep distances, can thus also be fulfilled.

The object according to the invention is also solved by means of an above-mentioned TIG welding torch body, in the case of which a connection channel, which is formed for connecting two orifices of channels for guiding a cooling medium arranged on the lateral side in the receiving part of a TIG welding torch handle, is arranged at the plug element on the lateral side. The modular and flexible construction of the welding torch is also applicable in the case of a TIG welding torch comprising consumable auxiliary material or welding wire, respectively. With regard to the advantages attained thereby, reference is made to the above description of the MIG/MAG welding torch body.

The object according to the invention is also solved by means of an above-mentioned MIG/MAG welding torch handle, in the case of which a second channel, which is arranged coaxially to the central channel, and a further third channel, which is arranged coaxially to the second channel, is provided, wherein a connection is provided between second channel and third channel, and the first channel has an orifice in the center of the receiving part, the second channel has an orifice on the lateral side of the receiving part, and the third channel has an orifice on the lateral side of the receiving part. Coaxial arrangement is understood to be an arrangement at different distances from the central axis of the MIG/MAG welding torch handle. The channels can be realized differently, for example as simple holes, but also in the form of annular spaces or the like. Due to the special arrangement of a total of three channels for guiding the protective gas, the consumable welding wire, and/or of a cooling medium, in particular water, a different flow-through of the channels with the protective gas or cooling medium, and the guide-through of the consumable welding wire is made possible, depending on the connection of the conduits and hoses of the hose package. The welding wire, the protective gas, and cooling medium in the corresponding channels ultimately opens out in the respective channels in the respective connected MIG/MAG welding torch body. The first channel has an orifice in the center of the receiving part, the second channel has an orifice on the lateral side of the receiving part, and the third channel has an orifice on the lateral side of the receiving part. Due to such an arrangement of the orifices of the channels inside the receiving part, a different course of the protective gas and of the cooling medium is attained, and the use of a gas-cooled welding torch body as well as of a water-cooled welding torch body at the same welding torch handle is made possible, depending on the used welding mediums (protective gas and, if need be, cooling medium). The orifice of the third channel arranged at the receiving part on the lateral side merges into the connection channel of the plug element of the welding torch body. When the welding torch body is connected, the orifice of the first channel in the receiving part corresponds to the gas channel in the plug element of the welding torch body. The orifice of the second channel on the casing side of the receiving part, in turn, corresponds to the connection channel at the plug element of the welding torch body. Corresponding connectors for the welding wire or the wire core, respectively, for guiding the welding wire, the welding current, the protective gas, and the cooling medium, which are connected accordingly, depending on the used hose package, are provided at the end of the welding torch handle facing the hose package. The connection of a gas-cooled as well as of a water-cooled welding torch body, and the connection to a hose package with or without cooling medium conduits is thus made possible with the production of a welding torch handle, which is formed essentially identically. Depending on the desired combination, sealing elements for sealing a channel or for sealing regions between channels (e.g. by means of O rings), etc., or similar auxiliary means are required, if need be, which will be described further below.

The current transmission element preferably consists of a sleeve made of electrically conductive material comprising axially arranged slits for forming the second channel, and an insulation element arranged thereabove made of electrically insulating material. A correspondingly good electrical contact for transferring the welding current is established via the sleeve made of electrically conductive material.

When at least one sealing element for sealing at least one channel is provided, the conditions for connecting the welding torch handle to a hose package without cooling medium conduits can be created in a simple way. The welding torch handle can thus also be used only for guiding the welding wire and for transferring the protective gas, while the other channels, which would serve for guiding a cooling medium, are closed by means of corresponding sealing elements.

When, according to a further feature of the invention, a tube for inserting into the third channel and for simultaneously sealing the connection is provided, a further change of the course of the cooling medium in the channels of the welding torch handle can be attained in a simple manner for certain applications.

According to a further feature of the invention, the receiving part has fixing elements on the inner side, which cooperate with fixing elements of a complementary shape on the torch closure of the MIG/MAG welding torch body. As already mentioned above in connection with the MIG/MAG welding torch body, the fixing elements can be formed by means of corresponding locking noses and guide grooves or the like, in order to attain the fixation of the welding torch body relative to the welding torch handle by means of a combined axial movement and rotational movement. A simple, quick, and tool-free assembly and disassembly of the welding torch body to and from the welding torch handle is made possible in this way.

To prevent or to hamper an unwanted detaching of the welding torch body from the welding torch handle, an unlocking element for unlocking the fixation of the welding torch body can be provided at the welding torch handle. Such an unlocking element is preferably formed by a spring-preloaded actuating button, which the welder has to push or move prior to detaching the welding torch body from the welding torch handle against the spring force.

A check valve can be arranged in the third channel of the welding torch handle. By means of such a check valve, it can be prevented that residues of a liquid cooling medium, in particular of water, reaches out of the third channel into the gas channel of the welding torch body, which could lead to a weld quality loss during the welding. Water droplets, which may be present upstream of the check valve, and residues of the cooling medium are usually removed by blowing out with compressed air prior to performing the welding process.

To actuate the welding torch, a switch, button, or similar actuating element for turning on and turning off the welding current is arranged at the welding torch handle.

The object according to the invention is also solved by means of an above-mentioned MIG/MAG welding torch, comprising an above-mentioned MIG/MAG welding torch body and an above-mentioned MIG/MAG welding torch handle. With regard to the advantages, which can be attained thereby, compared to known welding torches, in particular the higher flexibility when combining gas-cooled welding components with water-cooled welding components, reference is made to the above description of the welding torch body and welding torch handle.

The invention will be described in more detail on the basis of the enclosed drawings, in which:

FIG. 2 shows a schematic view of a portion of a gas-cooled MIG/MAG welding torch body formed according to the invention;

FIG. 3 shows a schematic view of a portion of a water-cooled MIG/MAG welding torch body formed according to the invention;

FIG. 4 shows a schematic view of a MIG/MAG welding torch handle formed according to the invention for the plug connection to a MIG/MAG welding torch body according to FIG. 2 or FIG. 3;

FIG. 5 shows a schematic course of the protective gas and of the consumable welding wire when connecting a gas-cooled MIG/MAG welding torch body according to FIG. 2 to the MIG/MAG welding torch handle according to FIG. 4 and a gas-cooled hose package;

FIG. 6 shows a schematic course of the protective gas, of the welding wire, and cooling medium when connecting a gas-cooled MIG/MAG welding torch body according to FIG. 2 to the MIG/MAG welding torch handle according to FIG. 4 and a water-cooled hose package;

FIG. 7 shows a schematic course of the protective gas and welding wire when connecting a water-cooled MIG/MAG welding torch body according to FIG. 3 to the MIG/MAG welding torch handle according to FIG. 4 and a gas-cooled hose package;

FIG. 8 shows a schematic course of the protective gas, welding wire, and cooling medium when connecting a water-cooled MIG/MAG welding torch body according to FIG. 3 to the MIG/MAG welding torch handle according to FIG. 4 and a water-cooled hose package;

Figure 1:
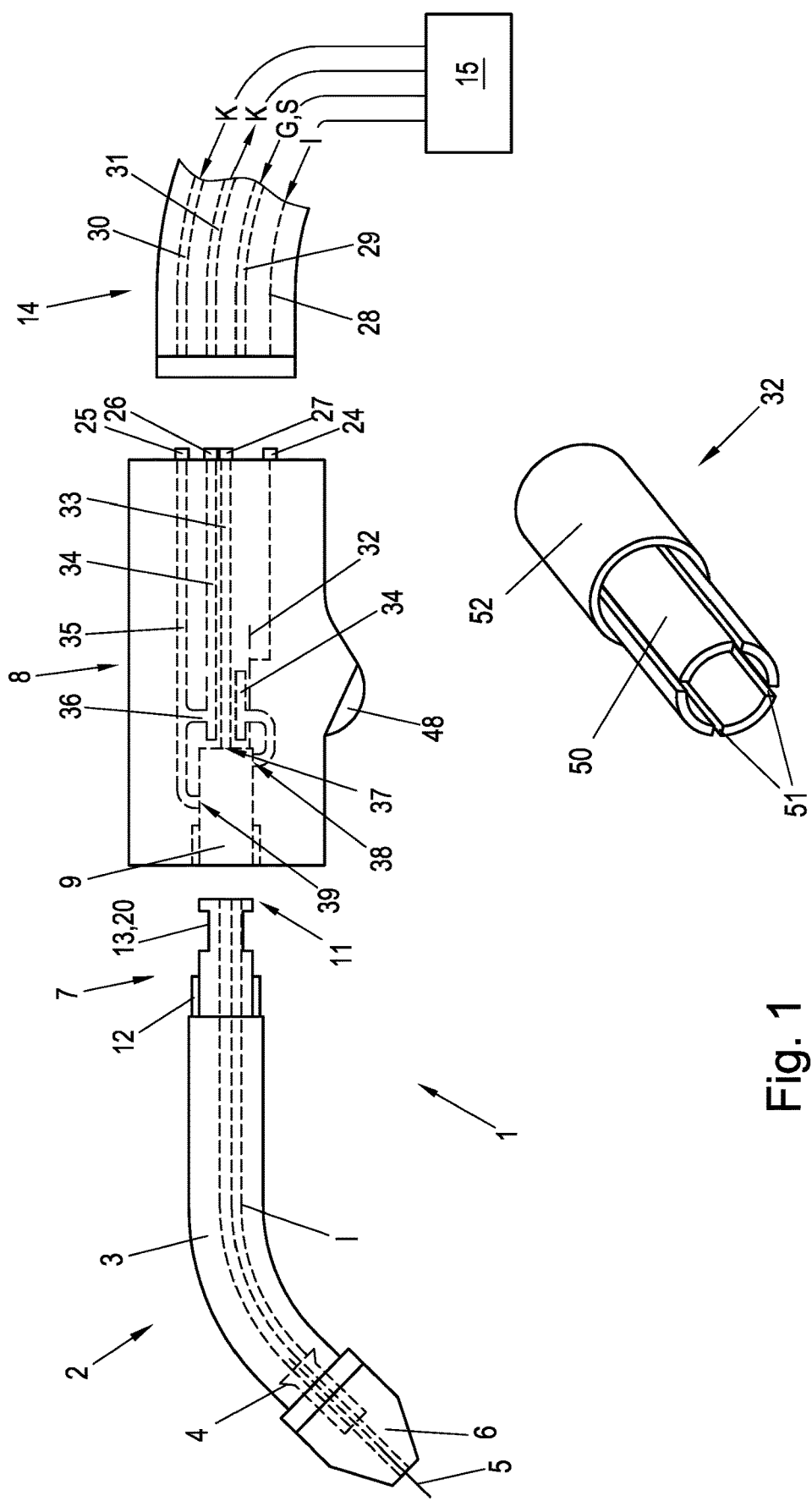
FIG. 1 shows a schematic view of a MIG/MAG welding torch according to the invention.

FIG. 1 shows a schematic view of a MIG/MAG welding torch 1. The MIG/MAG welding torch 1 consists of the MIG/MAG welding torch body 2 and the MIG/MAG welding torch handle 8. The MIG/MAG welding torch body 2 can be detachably connected, preferably detachably in a tool-free manner, to the MIG/MAG welding torch handle 8. The MIG/MAG welding torch handle 8, in turn, is connected to a corresponding hose package 14 or the conduits and hoses running therein, respectively.

The MIG/MAG welding torch body 2 of the MIG/MAG welding torch 1 consists of the so-called pipe bend 3, a contact nozzle 4 for contacting and guiding a consumable welding wire 5, a gas nozzle 6, and an essentially cylindrical plug element 7 arranged in the pipe bend 3 for the detachable connection to a corresponding receiving part 9 of the MIG/MAG welding torch handle 8. The gas channel 10 for guiding the protective gas G to the gas nozzle 6 runs in the plug element 7 of the MIG/MAG welding torch body 2. The gas channel 10 is simultaneously formed to guide the consumable welding wire 5. The gas channel 10 opens out at the distal end 11 of the plug element 7. A connection channel 13, which is formed for the connection of two orifices 38, 39 of channels 34, 35 for guiding a cooling medium K, which are arranged in the receiving part 9 of the MIG/MAG welding torch handle 8, is furthermore arranged at the plug element 7. The plug element 7 of the MIG/MAG welding torch body 2 is preferably formed for the plug connection to the receiving part 9 of the MIG/MAG welding torch handle 8, and has a so-called torch closure 12, which is formed for the fixation to the receiving part 9 of the MIG/MAG welding torch handle 8, so as to be rotatable preferably by 180°. For example, the MIG/MAG welding torch body 2 is inserted axially into the receiving part 9 of the MIG/MAG welding torch handle 8 so as to be rotated by 180° with respect to the position illustrated in FIG. 1, and is then interlocked with the MIG/MAG welding torch handle 8 by means of a reverse rotation by 180°. For this purpose, corresponding fixing elements 22 are arranged on the outer sides of the torch closure 12, and fixing elements 23 of a complementary design are arranged on the inner side of the receiving part 9 of the MIG/MAG welding torch handle 8, as it is illustrated in FIGS. 2, 3, and 4. Under the condition of certain mechanisms, a rotatability of the MIG/MAG welding torch body 2 or of at least a portion thereof and a fixation thereof in different angular positions can be made possible.

Depending on the embodiment of the MIG/MAG welding torch body 2 (gas-cooled or water-cooled), the connection channel 10 at the plug element 7 has a different construction. In the case of the MIG/MAG welding torch body 2, which is not or only gas-cooled, respectively, the connection channel 13 is formed as circumferential channel 20 at the plug element 7, which is spaced apart from the distal end 11 of the plug element 7, as illustrated in FIG. 1 and FIG. 2. The connection channel 13, here the circumferential channel 20, connects the second channel 34 with the third channel 35 at the MIG/MAG welding torch handle 8.

Provided that the MIG/MAG welding torch body 2 has a water cooling or cooling by means of a different cooling medium K, the connection channel 13 is formed by specifically running channels in the plug element 7, as will be described on the basis of the example according to FIG. 3.

The MIG/MAG welding torch handle 8 preferably includes connectors 24, 25, 26, and 27 for connection to a wire core S for guiding the welding wire 5, a corresponding welding current conduit 28 for transferring the welding current I, a protective gas conduit 29 for conveying a protective gas G and, if need be, a cooling medium feed 30 and a cooling medium return 31 of a hose package 14, via which the welding wire 5 is fed and discharged through the wire core S, the protective gas G, a cooling medium K, in particular water. The hose package 14 can also be fixedly connected to the welding torch handle 8 and can be sold as unit. Such units are usually available in different hose package lengths. The hose package 14 is therefore connected to the welding device 15, which includes the current source for the provision of the welding current I, a conveying means for conveying the welding wire 5 through the wire core S, a reservoir for providing the protective gas G, as well as a container for the cooling medium K.

The MIG/MAG welding torch handle 8 furthermore has a current transmission element 32 for transferring the welding current I, which comprises a central channel 33. The receiving part 9 for the detachable connection to the plug element 7 of the MIG/MAG welding torch body 2 is furthermore arranged in the MIG/MAG welding torch handle 8. According to the invention, the MIG/MAG welding torch handle 8 has, in addition to the central channel 33, a second channel 34, which is arranged coaxially to the central channel 33, and is a further third channel 35, which is arranged coaxially to the second channel, wherein a connection 36 is arranged between the second channel 34 and the third channel 35. The second channel 34 is preferably at least partially formed as annular space, which runs around the central channel 33. The second channel 34 is connected to the connector 26, and the third channel 35 is connected to the connector 25. The welding current I supplied by the current source of the welding device 15 (see FIG. 1) is connected to the current transmission element 32 via the connector 24.

To attain certain courses of the welding wire 5, of the protective gas G, and of the cooling medium K, the orifices of the channels 33, 34, 35 are arranged accordingly in the receiving part 9 of the MIG/MAG welding torch handle 8. The first, central channel of the welding torch handle 8 opens out in an orifice 37 essentially in the center of the end of the receiving part 9. The second channel 34 is connected to an orifice 38 on the lateral side of the receiving part 9. Lastly, the third channel 35 opens out in an orifice 39 arranged on the lateral side of the receiving part 9. In the case of a corresponding connection of the MIG/MAG welding torch body 2 to the MIG/MAG welding torch handle 8, the orifice 39 of the channel 35 corresponds to the correspondingly arranged connection channel 13 at the plug element 7 of the MIG/MAG welding torch body 2, so that the course of the cooling medium K via the MIG/MAG welding torch handle 8 to the MIG/MAG welding torch body 2 is made possible.

It is pointed out that the illustrated courses and orifices of the channels only show an exemplary embodiment, which can also be modified accordingly as part of the present invention.

In the case of the water-cooled MIG/MAG welding torch body 2 (see FIG. 3), the openings or orifices, respectively, of the cooling medium channels therefore correspond to the orifices in the receiving part 9 of the welding torch handle 8, so that a course of the cooling medium K through the desired channels is made possible.

The central channel 33 and the channel 34 can be formed by a current transmission element 32, which is constructed, for example, of a sleeve 50 made of electrically conductive material comprising axially arranged slits 51. A cylindrical insulation element 52 made of electrically insulating material is arranged above the sleeve 50. An exemplary embodiment of such a current transmission element 32 is illustrated in the lower right part of FIG. 1.

A switch 48, button, or similar actuating element for turning on and turning off the welding current I can furthermore be arranged at the MIG/MAG welding torch handle 8.

An embodiment of a gas-cooled MIG/MAG welding torch body 2 according to the invention is illustrated in FIG. 2. In addition to the embodiment version according to FIG. 1, a fixing element 22 is illustrated here at the torch closure 12 of the MIG/MAG welding torch body 2, which cooperates with a correspondingly designed fixing element 23 at the receiving part 9 of the MIG/MAG welding torch handle 8, and which provides for the fixation of the welding torch body 2 to the welding torch handle 8 by means of a combined axial and rotating movement. The connection channel 13 is formed by means of a circumferential channel 20 at the plug element 7, by means of which the orifice 38 of the second channel 34 and the orifice 39 of the third channel 35 are connected in the MIG/MAG welding torch handle 8, so that a cooling means K, which, if need be, is fed by the hose package 14, can be deflected and can be returned via the hose package 14 again.

FIG. 3 shows a schematic view of a water-cooled MIG/MAG welding torch body 2 according to the invention. The connection channel 13 in the plug element 7 of the water-cooled MIG/MAG welding torch body is formed by a channel 17 for feeding the cooling medium K and a channel 18 for returning the cooling medium K, wherein the channel 17 for feeding the cooling medium K opens out in an inlet opening 16 arranged at the plug element 7 on the lateral side, and the channel 18 for returning the cooling medium K opens out to a return opening 21 arranged at the plug element 7 on the lateral side. The orifice of the inlet opening 16 corresponds to the orifice 39 of the third channel 35 at the MIG/MAG welding torch handle 8, and the mouth of the return opening 21 corresponds to the orifice 38 at the MIG/MAG welding torch handle 8. The cooling medium can thus be guided from the hose package 14 via the MIG/MAG welding torch handle 8 into the MIG/MAG welding torch body 2, and back again, and can cool the components of the MIG/MAG welding torch 1 accordingly.

FIG. 4 shows a schematic view of a MIG/MAG welding torch handle 8 according to the invention for the plug connection to a MIG/MAG welding torch body 2 according to FIG. 2 or FIG. 3. As already described in the context with FIG. 1, the orifices 37, 38, and 39 of the channels 33, 34, and 35 of the welding torch handle 8 are located at the receiving part 9 at certain points, where they correspond to or cooperate with the correspondingly formed connection channels 13 at the plug element 7 of the respective MIG/MAG welding torch body 2.

Fixing elements 23, which cooperate with fixing elements 22 of a complementary design at the torch closure 12 of the MIG/MAG welding torch body 2, are arranged on the inner side of the receiving part 9. An unlocking element 46 for unlocking the fixation of the MIG/MAG welding torch body 2, which has to be actuated by the welder prior to removing the MIG/MAG welding torch body 2 from the MIG/MAG welding torch handle 8, can also be provided at the MIG/MAG welding torch handle 8.

A check valve 47, which prevents that residues of the cooling medium K reach via the orifice 39 into the gas channel 10 of the MIG/MAG welding torch body 2 and could reduce the weld quality there during the welding process, can be arranged in the third channel 35. Prior to the use of the MIG/MAG welding torch 1, the receiving part 9 of the MIG/MAG welding torch handle 8 is usually blown out with compressed air, so that the channels, through which cooling medium K may possibly have flown through beforehand, are freed from cooling medium residues. When the check valve 47—as illustrated—is arranged directly at the orifice 39, this region can thus also be optimally freed from cooling medium residues.

It is pointed out that the MIG/MAG welding torch body 2 as well as the MIG/MAG welding torch handle 8 does not have to consist of a main component, as outlined, but can be formed from several parts, which can consist of different materials and which are formed by corresponding combination of the various channels and connection elements.

The schematic course of the protective gas G and of the consumable welding wire 5 when connecting a gas-cooled MIG/MAG welding torch body 2 according to FIG. 2 to the MIG/MAG welding torch handle 8 according to FIG. 4 and a gas-cooled hose package 14 is illustrated in FIG. 5. The welding current conduit 28 of the hose package 14 is connected to the connector 24 for feeding the welding current I at the MIG/MAG welding torch handle 8, in order to provide for a transfer of the welding current I from the connector 24 to the current transmission element 32 of the MIG/MAG welding torch handle 8, and subsequently via the plug element 7 or the current-carryinglive part thereof to the contact nozzle 4 of the MIG/MAG welding torch body 2.

The welding wire 5 is guided via the wire core S in the hose package 14 via the central channel 33 in the MIG/MAG welding torch handle 8 and the gas channel 10 in the MIG/MAG welding torch body. The protective gas conduit 29 of the hose package 14 is connected to the connector 27 of the MIG/MAG welding torch handle 8 for feeding the protective gas G, which is connected to the central channel 33. The connection channel 13, which is formed by the circumferential channel 20, at the plug element 7 of the MIG/MAG welding torch body 2, which connects the second channel 34 and the third channel 35, is ineffective here, because no cooling medium is fed and discharged via the hose package 14 in the case of this embodiment version.

To prevent that the protective gas G can escape via the connectors 25, 26 of the channels 34, 35, corresponding sealing elements 43, 44 are arranged in the channels 34, 35. These sealing elements can, for example, be inserted into the channels 34, 35 and can be axially fixed. It goes without saying that the sealing elements 43, 44 can also include sealing rings made of elastic material (not illustrated), or can also be formed differently, for example in the form of caps or the like, at the connectors 25, 26.

FIG. 6 shows the schematic course of the protective gas G, of the welding wire 5, and cooling medium K when connecting a gas-cooled MIG/MAG welding torch body 2 according to FIG. 2 to the MIG/MAG welding torch handle 8 according to FIG. 4 and a water-cooled hose package 14. Here, the protective gas conduit 29 of the hose package 14 is connected to the connector 27 of the central channel 33. The welding wire 5 fed via a wire core S in the hose package 14 is also fed through the central channel. The cooling medium feed 30 is connected to the connector 25 of the third channel 35, and the cooling medium return 31 is connected to the connector 26 of the second channel 34. A tube 45, which closes the connection 36 between third channel 35 and second channel 34, is inserted into the channel 35. The cooling medium K thus runs via the connector 25, the third channel 35 into the orifice 39 and into the connection channel 13, which is formed as circumferential channel 20 at the plug element 7 of the MIG/MAG welding torch body 2. The cooling medium K runs via the orifice 38 into the second channel 34 and is returned via the channel 31 of the hose package 14. A flowing of the cooling medium K into the third channel 35 is prevented by means of the tube 45 and the closure of the connection 36 between second channel 34 and third channel 35. Due to the fact that the cooling medium K also flows through a portion of the MIG/MAG welding torch handle 8, it can likewise be cooled, in particular in the region of the current transmission element 32.

FIG. 7 shows the schematic course of the protective gas G and of the welding wire 5 when connecting a water-cooled MIG/MAG welding torch body 2 according to FIG. 3 to the MIG/MAG welding torch handle 8 according to FIG. 4 and a gas-cooled hose package 14. In the case of this version, the protective gas conduit 29 of the hose package 14 is connected to the connector 27 of the MIG/MAG welding torch handle 8, whereby the protective gas G and the welding wire 5 runs through the central channel 33, reaches from the orifice 37 into the central inlet opening 19 of the gas channel 10 at the distal end 11 of the plug element 7 of the MIG/MAG welding torch body 2. The orifice 16 of the channel 17 corresponds to the orifice 39 of the third channel 35, and the return opening 21 corresponds to the orifice 38 of the second channel 34. Due to the fact that no cooling medium K is fed and discharged via the hose package here, the channels are ineffective here. The channels 34, 35 are thus also closed by means of corresponding sealing elements 43, 44.

The schematic course of the protective gas G, welding wire 5, and cooling medium K when connecting a water-cooled MIG/MAG welding torch body 2 according to FIG. 3 to the MIG/MAG welding torch handle 8 according to FIG. 4 and a water-cooled hose package 14 is outlined in FIG. 8. In the case of this version, the protective gas conduit 29 and the wire core S for guiding the welding wire 5 of the hose package 14 is connected to the connector 27 of the MIG/MAG welding torch handle 8, whereby the protective gas G and the welding wire 5 reaches via the central channel 33 to the orifice 37 and via the inlet opening 19 at the plug element 7 into the gas channel 10 and to the gas nozzle 6 of the MIG/MAG welding torch body 2.

The cooling medium feed 30 of the hose package 14 is connected to the connector 25, which is connected to the third channel 35 of the MIG/MAG welding torch handle 8, so that the cooling medium K can reach via the channel 35 and the orifice 39 into the inlet opening 16 of the channel 17 at the distal end 11 of the plug element 7 to the gas nozzle 6, and lastly reaches via the channel 18 and the return opening 21 into the orifice 38 in the receiving part 9 of the MIG/MAG welding torch handle 8, and reaches into the second channel 34 there, and finally to the connector 26, which is connected to the cooling medium return 31 of the hose package 14. To prevent a flowing of the cooling medium K via the connection 36 into the second channel 34, a tube 45 is arranged into the third channel 35, which closes the connection 36, similarly as in the case of the version according to FIG. 6.

Figure 9:
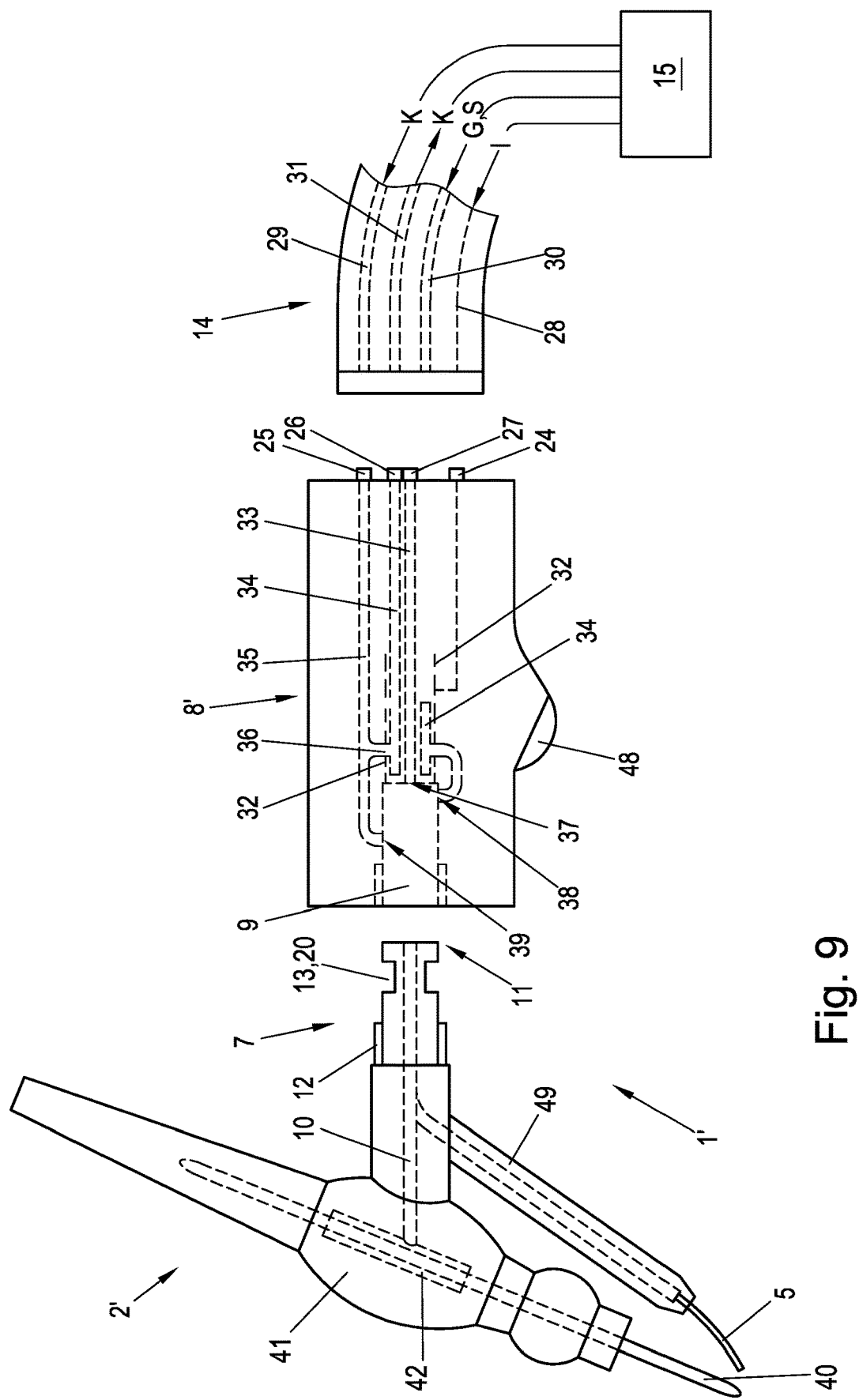
FIG. 9 shows a schematic view of a TIG welding torch body comprising a feeding means for a consumable welding wire using the connections according to the invention between welding torch body, welding torch handle, and hose package.

Lastly, FIG. 9 shows a schematic view onto a TIG welding torch 1' comprising TIG welding torch body 2', comprising a torch neck 41, an electrode holder 42 for receiving a non-consumable welding electrode 40, a gas nozzle 6, and an essentially cylindrical plug element 7 arranged in the torch neck 41 for the detachable connection to a receiving part 9 of a TIG welding torch handle 8', said plug element 7 having an inlet opening 19 for the protective gas G, and a gas channel 10, which is connected to the inlet opening 19, for guiding the protective gas G to the gas nozzle 6, and which is formed for transferring a welding current I to the electrode holder 42, and comprising a means 49 for feeding a consumable welding wire 5. As in the case of the above-described MIG/MAG welding torch 1, the gas channel 10 in the case of the TIG welding torch body 2' is simultaneously also formed for guiding the welding wire 5, and the inlet opening 19 is arranged essentially centrally at the distal end 11 of the plug element 7, and a connection channel 13 is arranged at the plug element 7, which is formed to connect two orifices 38, 39, which are arranged in the receiving part 9 of the TIG welding torch handle 8', of channels 34, 35 for guiding a cooling medium K. With regard to the advantages, which can be attained thereby, reference is made to the above description in connection with the MIG/MAG welding torch 1.

The welding torch according to the present invention is characterized by a simple design, high flexibility of the connection of a gas-cooled welding torch body or water-cooled welding torch body, with a welding torch handle and a gas-cooled hose package or water-cooled hose package.

The invention claimed is:

1. A MIG/MAG welding torch body (2), comprising:
a pipe bend (3);
a contact nozzle (4) for contacting and guiding a consumable welding wire (5);
a gas nozzle (6); and
an essentially cylindrical plug element (7), which is arranged at the pipe bend (3), for the detachable connection to a corresponding receiving part (9) of a MIG/MAG welding torch handle (8), said plug element (7) having an inlet opening (19) for the protective gas (G), and a gas channel (10), which is connected to the inlet opening (19), for guiding the protective gas (G) to the gas nozzle (6) and simultaneously for guiding the welding wire (5), and which is formed for transferring a welding current (I) to the contact nozzle (4);
wherein the inlet opening (19) is arranged essentially centrally at the distal end (11) of the plug element (7);
wherein the plug element (7) is formed for the plug connection to the receiving part (9) of the MIG/MAG welding torch handle (8), and has a torch closure (12), which is formed for the fixation to the receiving part (9) of the MIG/MAG welding torch handle (8), so as to be rotatable preferably by 180°; and
wherein a connection channel (13), which is formed by means of a circumferential channel (20), which is spaced apart from the distal end (11) of the plug element (7), and which, when the MIG/MAG welding torch handle (8) is connected, is formed for connecting two orifices (38, 39) of channels (34, 35) for guiding a cooling medium (K) arranged on the lateral side in the receiving part (9) of the MIG/MAG welding torch handle (8), is arranged at the plug element (7) on the lateral side.

2. A MIG/MAG welding torch body (2), comprising:
a pipe bend (3);
a contact nozzle (4) for contacting and guiding a consumable welding wire (5);
a gas nozzle (6); and
an essentially cylindrical plug element (7), which is arranged at the pipe bend (3), for the detachable connection to a corresponding receiving part (9) of a MIG/MAG welding torch handle (8), said plug element (7) having an inlet opening (19) for the protective gas (G), and a gas channel (10), which is connected to the inlet opening (19), for guiding the protective gas (G) to the gas nozzle (6) and simultaneously for guiding the welding wire (5), and which is formed for transferring a welding current (I) to the contact nozzle (4);
wherein the inlet opening (19) is arranged essentially centrally at the distal end (11) of the plug element (7);
wherein the plug element (7) is formed for the plug connection to the receiving part (9) of the MIG/MAG welding torch handle (8), and has a torch closure (12), which is formed for the fixation to the receiving part (9) of the MIG/MAG welding torch handle (8), so as to be rotatable preferably by 180°; and
wherein a connection channel (13) is arranged at the plug element (7) on the lateral side, said connection channel (13) being formed by means of a channel (17) for feeding the cooling medium (K), and a channel (18) for returning the cooling medium (K), wherein the channel (17) for feeding the cooling medium (K) opens out in an inlet opening (16), which is arranged at the plug element (7) on the lateral side, and the channel (18) for returning the cooling medium (K) opens out in a return opening (21), which is arranged at the plug element (7) on the lateral side, and said connection channel (13), when the MIG/MAG welding torch handle (8) is connected, is formed for connecting two orifices (38, 39) of channels (34, 35) for guiding a cooling medium (K) arranged on the lateral side in the receiving part (9) of the MIG/MAG welding torch handle (8).

3. The MIG/MAG welding torch body (2) according to claim 1, wherein the torch closure (12) is formed so as to be rotatable by 180°.

4. The MIG/MAG welding torch body (2) according to claim 1, wherein the torch closure (12) is formed in an essentially tubular manner and has fixing elements (22) on the outer side, which cooperate with fixing elements (23) of a complementary design at the receiving part (9) of the MIG/MAG welding torch handle (8).

5. The MIG/MAG welding torch body (2) according to claim 1, wherein the plug element (7) is made of metal, in particular brass, and the torch closure (12) is made of plastic.

6. A TIG welding torch body (2'), comprising:
a torch neck (41);
an electrode holder (42) for receiving a non-consumable welding electrode (40);
a gas nozzle (6); and
an essentially cylindrical plug element (7), which is arranged in the torch neck (41), for the detachable connection to a corresponding receiving part (9) of a TIG welding torch handle (8'), and comprising a means (49) for feeding a consumable welding wire (5), said plug element (7) having an inlet opening (19) for the protective gas (G), and a gas channel (10), which is connected to the inlet opening (19), for guiding the protective gas (G) to the gas nozzle (6) and simultaneously for guiding the welding wire (5), and which is formed for transferring a welding current (I) to the electrode holder (42);
wherein the inlet opening (19) is arranged essentially centrally at the distal end (11) of the plug element (7);
wherein the plug element (7) is formed for the plug connection to the receiving part (9) of the TIG welding torch handle (8'), and has a torch closure (12), which is formed for the fixation to the receiving part (9) of the TIG welding torch handle (8'), so as to be rotatable preferably by 180°;
wherein a connection channel (13), which is formed by means of a circumferential channel (20), which is spaced apart from the distal end (11) of the plug element (7), is arranged on the lateral side at the plug element (7), or the connection channel (13) is formed by means of a channel (17) for feeding the cooling medium (K), and a channel (18) for returning the cooling medium (K); and
wherein the channel (17) for feeding the cooling medium (K) opens out in an inlet opening (16), which is arranged at the plug element (7) on the lateral side, and the channel (18) for returning the cooling medium (K) opens out in a return opening (21), which is arranged at the plug element (7) on the lateral side, and the connection channel (13), when the TIG welding torch handle (8') is connected, is formed for connecting two orifices (38, 39) of channels (34, 35) for guiding a cooling medium (K) arranged on the lateral side in the receiving part (9) of the TIG welding torch handle (8').

7. A MIG/MAG welding torch handle (8), comprising:
a current transmission element (32);
a central channel (33); and
a receiving part (9) for the detachable connection to an essentially cylindrical plug element (7) of a MIG/MAG welding torch body (2);
wherein a second channel (34), which is arranged coaxially to the central channel (33), and a further third channel (35), which is arranged coaxially to the second channel (34), is provided; and
wherein a connection (36) is provided between second channel (34) and third channel (35), and the first channel (33) has an orifice (37) in the center of the receiving part (9), the second channel (34) has an orifice (38) on the lateral side of the receiving part (9), and the third channel (35) has an orifice (39) on the lateral side of the receiving part (9).

8. The MIG/MAG welding torch handle (8) according to claim 7, wherein at least one sealing element (43, 44) for sealing at least one channel (33, 34, 35) is provided.

9. The MIG/MAG welding torch handle (8) according to claim 7, wherein a tube (45) for inserting into the third channel (35) and for simultaneously sealing the connection (36) is provided.

10. The MIG/MAG welding torch handle (8) according to claim 7, wherein the receiving part (9) has fixing elements (23) on the inner side, which cooperate with fixing elements (22) of a complementary design at the torch closure (12) of the MIG/MAG welding torch body (2).

11. The MIG/MAG welding torch handle (8) according to claim 10, wherein an unlocking element (46) for unlocking the fixation of the MIG/MAG welding torch body (2) is provided.

12. The MIG/MAG welding torch handle (8) according to claim 7, wherein a check valve (47) is arranged in the third channel (35).

13. The MIG/MAG welding torch handle (8) according to claim 7, wherein a switch (48) for turning on and turning off the welding current (I) is arranged.

14. A MIG/MAG welding torch (1) comprising:
the MIG/MAG welding torch body (2) according to claim 1; and
a MIG/MAG welding torch handle (8) comprising: a current transmission element (32); a central channel (33); and a receiving part (9) for the detachable connection to an essentially cylindrical plug element (7) of a MIG/MAG welding torch body (2); wherein a second channel (34), which is arranged coaxially to the central channel (33), and a further third channel (35), which is arranged coaxially to the second channel (34), is provided; and wherein a connection (36) is provided between second channel (34) and third channel (35), and the first channel (33) has an orifice (37) in the center of the receiving part (9), the second channel (34) has an orifice (38) on the lateral side of the receiving part (9), and the third channel (35) has an orifice (39) on the lateral side of the receiving part (9).

* * * * *